(12) United States Patent
White

(10) Patent No.: US 7,538,777 B2
(45) Date of Patent: May 26, 2009

(54) AGGREGATION OF NON-LINEAR PIXEL EFFECTS

(75) Inventor: Steven White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 11/313,154

(22) Filed: Dec. 20, 2005

(65) Prior Publication Data

US 2007/0139438 A1 Jun. 21, 2007

(51) Int. Cl.
*G09G 5/02* (2006.01)
(52) U.S. Cl. .................................... 345/601; 345/602
(58) Field of Classification Search ............... 345/601, 345/602
See application file for complete search history.

(56) References Cited

U.S. PATENT DOCUMENTS

| 4,992,861 A | | 2/1991 | D'Errico | |
|---|---|---|---|---|
| 5,432,906 A | * | 7/1995 | Newman et al. | 345/501 |
| 5,715,376 A | | 2/1998 | Tadayoshi | |
| 5,987,167 A | * | 11/1999 | Inoue | 382/167 |
| 6,297,800 B2 | * | 10/2001 | Dagman | 345/601 |
| 6,603,483 B1 | * | 8/2003 | Newman | 345/593 |
| 7,034,842 B1 | * | 4/2006 | Sato et al. | 345/589 |
| 7,342,682 B2 | * | 3/2008 | Haikin et al. | 358/1.9 |
| 2001/0028357 A1 | * | 10/2001 | DeLean | 345/601 |
| 2002/0003630 A1 | | 1/2002 | Matama | |
| 2004/0036695 A1 | * | 2/2004 | Pethania et al. | 345/601 |

FOREIGN PATENT DOCUMENTS

| EP | 0525949 A2 | 2/1993 |
|---|---|---|
| WO | 2005101320 A1 | 10/2005 |

OTHER PUBLICATIONS

Written Opinion of the International Searching Authority (International Search Report); PCT/US2006/045393; Nov. 22, 2006; Microsoft Corporation.

* cited by examiner

*Primary Examiner*—M Good Johnson
(74) *Attorney, Agent, or Firm*—Shook, Hardy & Bacon LLP

(57) ABSTRACT

A system, a method and computer-readable media for applying curve effects to a digital image. Multiple curve effects are selected to be aggregated. The curve effects are applied to test pixel values. The outputs from this application are used to generate an aggregated look-up table. The aggregated look-up table is used to apply the curve effects to the digital image.

20 Claims, 8 Drawing Sheets

(12)  US 7,538,777 B2

AGGREGATION OF NON-LINEAR PIXEL EFFECTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The field of graphics processing applications, including image-processing packages, has broadened and matured to a point where many image processing programs and tools are capable of adjusting an array of image characteristics. Broadly speaking, many of these adjustments revolve around altering the color composition of a digital photograph or other image, or the exposure or lighting characteristics of the subject image or file. Within each category of task, commercially available programs typically offer a number of tools that change the relative amounts of red, green or blue (RGB) components or cyan, magenta, yellow or black (CMYK) component color in the pixels of an image.

To alter the color composition of an image, the color values associated with the image's pixels must undergo a transformation operation. These transformations may be referred to as effects. Certain effects use linear operations to alter the pixel values. For example, a levels effect uses a first-order curve with a linear slope to alter pixel data. As another example of a linear operation, a channel mixer effect is a three-dimensional matrix channel mapping of colors.

Non-linear operations may also be used to alter the color composition of an image. For example, curve effects are non-linear, single pixel channel transforms. These curve effects map each pixel's RGB channel data to new values based on a one-dimensional mapping or "curve." There are usually independent curves for each channel. So, for a single curve effect, there may be a different curve for the red, green and blue color channels. Curve effects may be used with controls for altering contrast, brightness, saturation or exposure.

An effect pipeline is often used to make modifications to an image. As known to those skilled in the art, an effect pipeline relates to a series of sequentially performed image-processing steps. The effect pipeline is generally designed to allow efficient processing of a digital image, while taking advantage of available hardware. For example, the pipeline may perform significant operations on a dedicated graphics processor unit (GPU). Effects pipelines today are used to dynamically modify image data "non-destructively." "Non-destructive editing" or "non-destructive processing" refers to editing (or processing) wherein rendering takes place beginning from unaltered originally-loaded image data. Each time a change is made, the alteration is added as one or more adjustments (or effects) added to the end of the pipeline. Hence the pipeline reflects the revision history (or progeny) of the image.

One limitation of conventional effect pipelines is that the non-destructive editing approach does not scale. In long effect pipelines, the application of curve effects can greatly increase delay and processing time. This result is exacerbated when adjustments are applied to effects near the beginning of the pipeline. As each subsequent effect needs to be re-applied for each render, the delay may be roughly proportional to the number of effects involved. To mitigate this delay, the adjacent linear operations may be aggregated into a single process. As known to those skilled in the art, linear operations can be easily combined into a single operation to enhance performance. When linear adjustments are not adjacent, the pipeline can often be re-ordered to aggregate them together. However, curve effects cannot be so easily combined. In fact, there are currently no techniques in the art for aggregating arbitrary non-linear pixel effects or even arbitrary non-linear 'curve' effects. Accordingly, multiple curve effects decrease performance in an effect pipeline and cause delays that are often noticeable to a user—often so much so that it makes non-destructive processing models impractical.

SUMMARY

The present invention meets the above needs and overcomes one or more deficiencies in the prior art by providing systems and methods for applying curve effects to a digital image. Multiple consecutive curve effects are selected to be aggregated in an effect pipeline. The curve effects are applied to test pixel values. The outputs from this application are used to generate an aggregated look-up table. This aggregated look-up table is used to apply the curve effects to the digital image.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Figure 1:
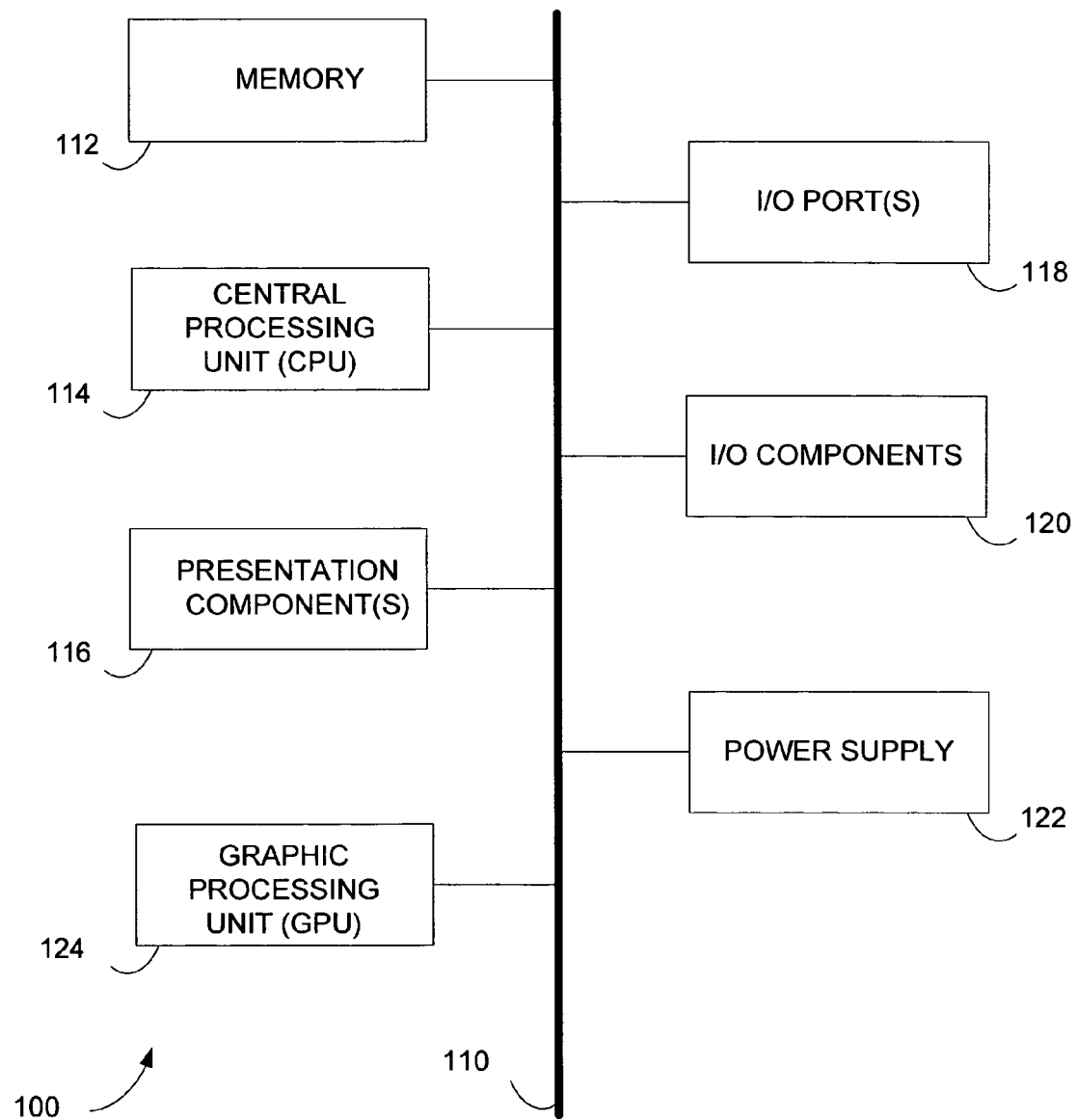
FIG. 1 is a block diagram of an exemplary computing system environment suitable for use in implementing the present invention.

An exemplary operating environment for the present invention is described below. Referring initially to FIG. 1, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices (e.g., cameras and printers), etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, a central processing unit (CPU) 114, one or more presentation components 116, input/output ports 118, input/output components 120, an illustrative power supply 122 and a graphics processing unit (GPU) 124. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, CPUs and GPUs have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of physical computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other physical medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, embodiments of the present invention provide systems and methods for applying effects to a digital image. It will be understood and appreciated by those of ordinary skill in the art that a "digital image," as the term is utilized herein, refers to any digital image data including static and/or dynamic digital image and any and all combinations or variations thereof. Utilizing the systems and methods herein described, pixel data may be transformed in a variety of ways.

To apply effects, Directed Acyclic Graphs ("graphs") or effect pipelines may be utilized. A graph may be implemented by using a GPU, a CPU or some combination of the two. GPUs differ from CPUs in that they utilize very high speed memory and couple it with a specialized processor that is capable of handling simple calculations on pixel data very efficiently. GPUs are not general-purpose processors. The GPU can perform fast pixel transformations, as well as 3D geometric transformations, much more rapidly than a CPU could accomplish the same task. This is largely due to the fact that, while CPUs can adequately perform a variety of general tasks, they are not optimized for any particular operation whereas GPU utilize very specialized hardware to perform graphics processing tasks.

The digital image processing model architecture described herein (i.e., the effect pipeline or graphs) is comprised of elements referred to herein as effects. An effect, as that term is utilized herein, is a basic image processing class. That is, effects are basically pixel operators. They take in one or more buffers of pixel data, manipulate the data, and output modified pixels. For instance, a sharpening effect takes in image pixels, sharpens the pixel edges, and outputs an image that is sharper than the image pixels taken in. In another example, a color balance effect takes in image pixel data, adjusts the color balance of the pixels, and outputs and image having modified color balance from what was taken in. The primary function of an effect is thus to process pixels.

Different effects, e.g., masking, blending, rotating, and the like, may be defined to implement a variety of image processing algorithms. In some embodiments, users are permitted to wire pre-defined effects together to achieve a desired result. If desired, a user may also define new effects to implement interesting image processing algorithms. Effects can process any number of input images and produce any number of output images.

Figure 2:
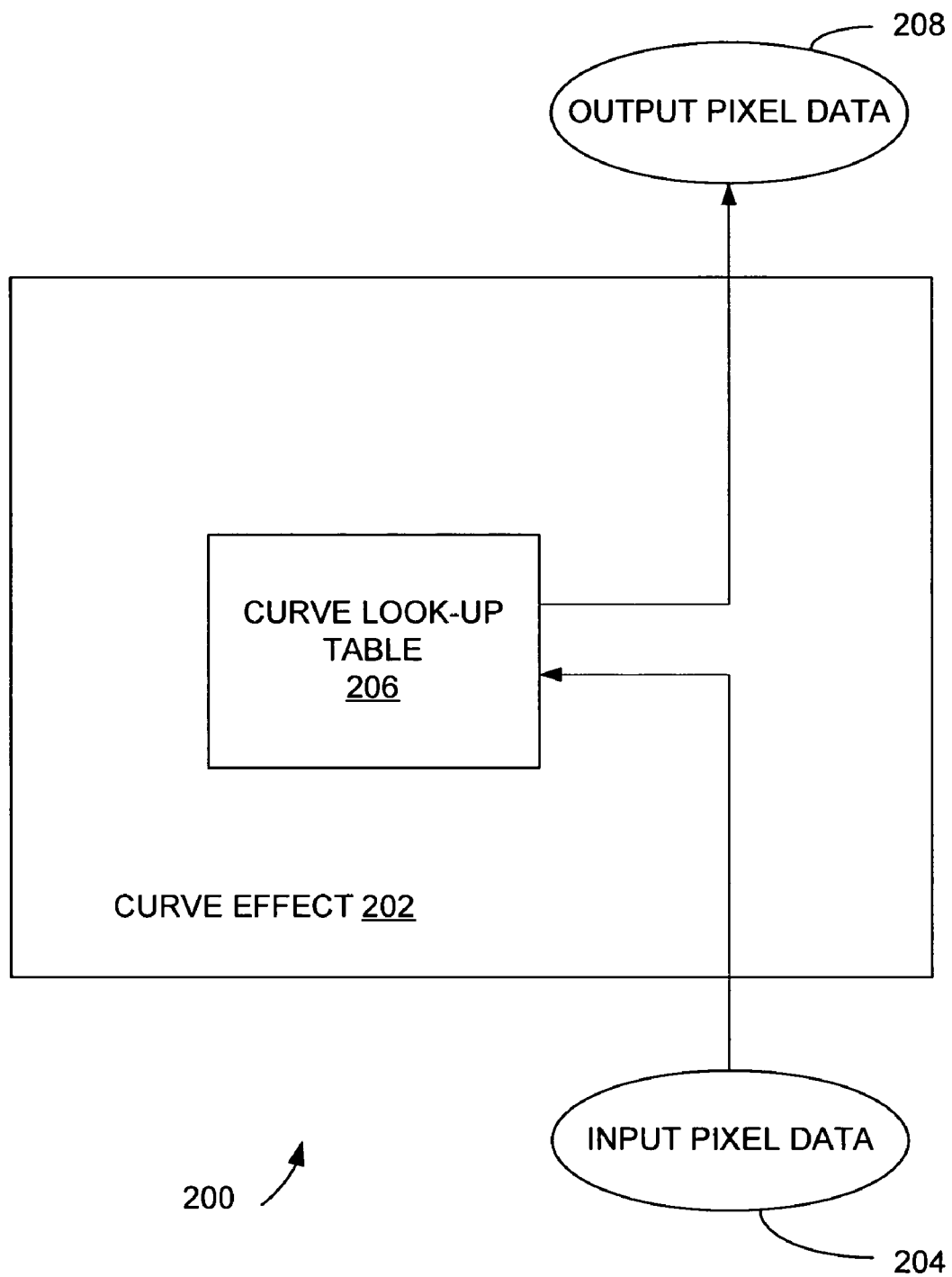
FIG. 2 is a schematic diagram illustrating an exemplary system for applying a curve effect to input data.

FIG. 2 illustrates a system 200 for applying a curve effect 202 to a digital image. Input pixel data 204 is fed into the curve effect 202. The input pixel data 204 may be derived from a digital image. A digital image may be comprised of pixels, and each of these pixels may have values indicating the pixel's color. For example, a pixel may have data indicating red, green and blue values.

When the curve effect 202 is applied to the input pixel data 204, the color values from the various pixels are converted into new values so as to reflect application of the curve effect 202. To make this conversion, a curve look-up table 206 is used. The look-up table 206 provides an output value for each pixel value in the input pixel data 204. For example, an input image may have a pixel with a red color channel value of 5. To apply the curve effect 202 to this pixel's red channel value, the output value associated with a red input of five is located in the look-up table 206. This output value is stored as output pixel data 208. In one embodiment, the look-up table 206 is an image, and the values of the incoming pixel data 204 are used to locate the addresses of output values in the curve look-up table 206. Further, the system 200 may include multiple look-up tables. For images having three color channels, three separate look-up tables may be employed. In one embodiment, the look-up table 206 is loaded from an application and is calculated from parameter values such as exposure correction, contrast or film response. As will be appreciated by those skilled in the art, each pixel value of an input image may be converted to an output value by the system 200.

It should be noted that any number of curve and non-curve transformations may be made with a look-up table such as the look-up table 206. These transformations may be referred to as "table-lookup effects." For example, arbitrary static or dynamic effects that map input data to output data may be table-lookup effects. Those skilled in the art will appreciate that, while the term "curve effects" is often used herein, the present invention in not limited to curve effect, and the present invention may be used to aggregate any number of table-lookup effects.

Figure 3:
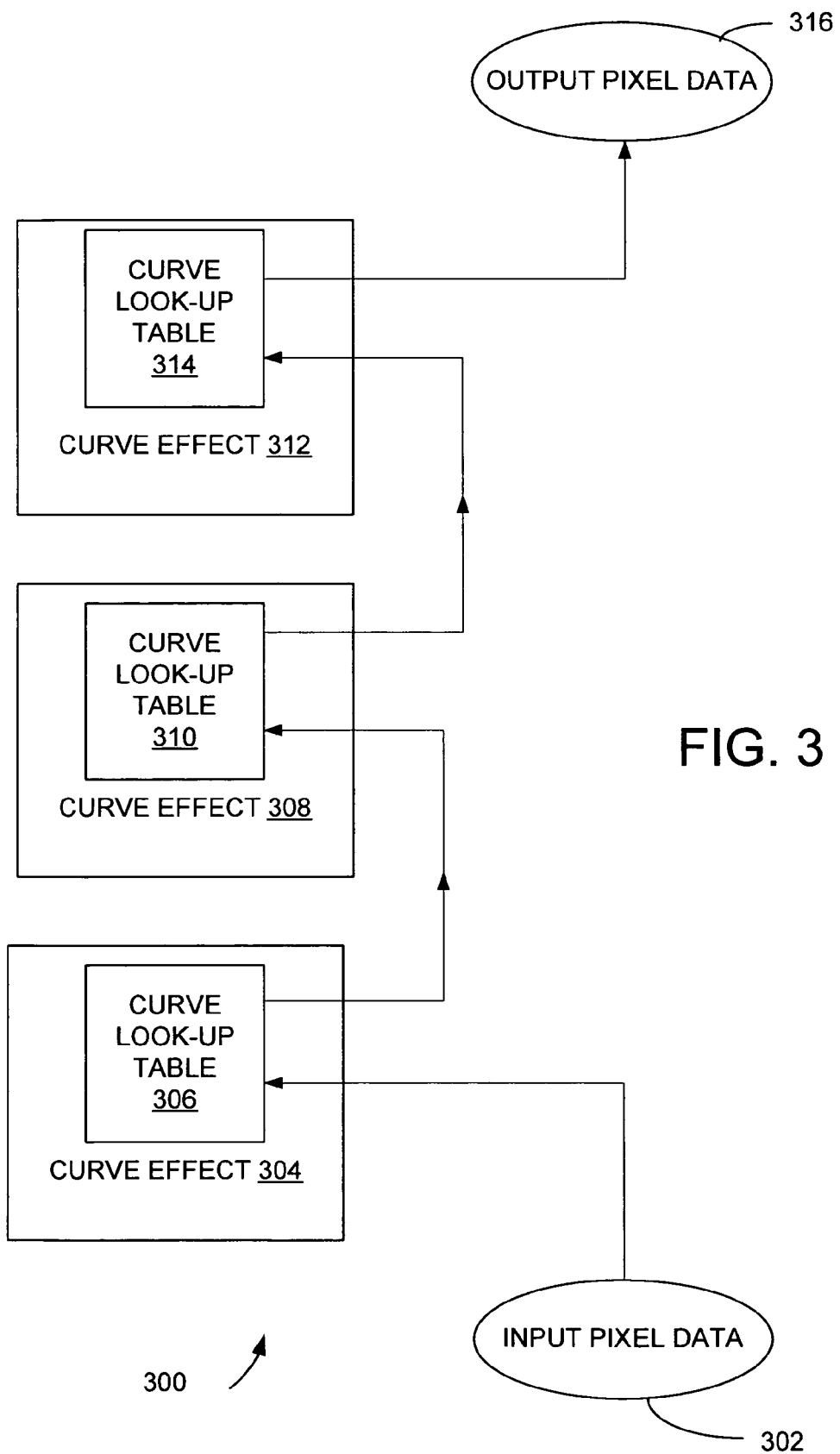
FIG. 3 is a schematic diagram illustrating an exemplary system for applying multiple curve effects to input data.

In an effect pipeline that applies a series of curve effects, each output image is fed into the input of the next curve effect. FIG. 3 illustrates a system 300 for applying a series of curve effects to a digital image. Input pixel data 302 is fed into a curve effect 304. The curve effect 304 uses a curve look-up table 306 to generate output data. In sequence, this output data is fed into a curve effect 308 and then into a curve effect 312. The data is converted as dictated by a curve look-up table 306, curve look-up table 308 and a curve look-up table 314. The resulting output pixel data 316 can then be used to form an output image reflecting the application of the curve effects 304, 308 and 312 to an input image. As will be appreciated by those skilled in the art, a large amount of image data must be mapped at each stage of the system 300 for typical image processing requests. As a separate lookup must be performed for each color channel, a series of curve effect lookups can quickly consume GPU (or CPU) resources.

Figure 4:
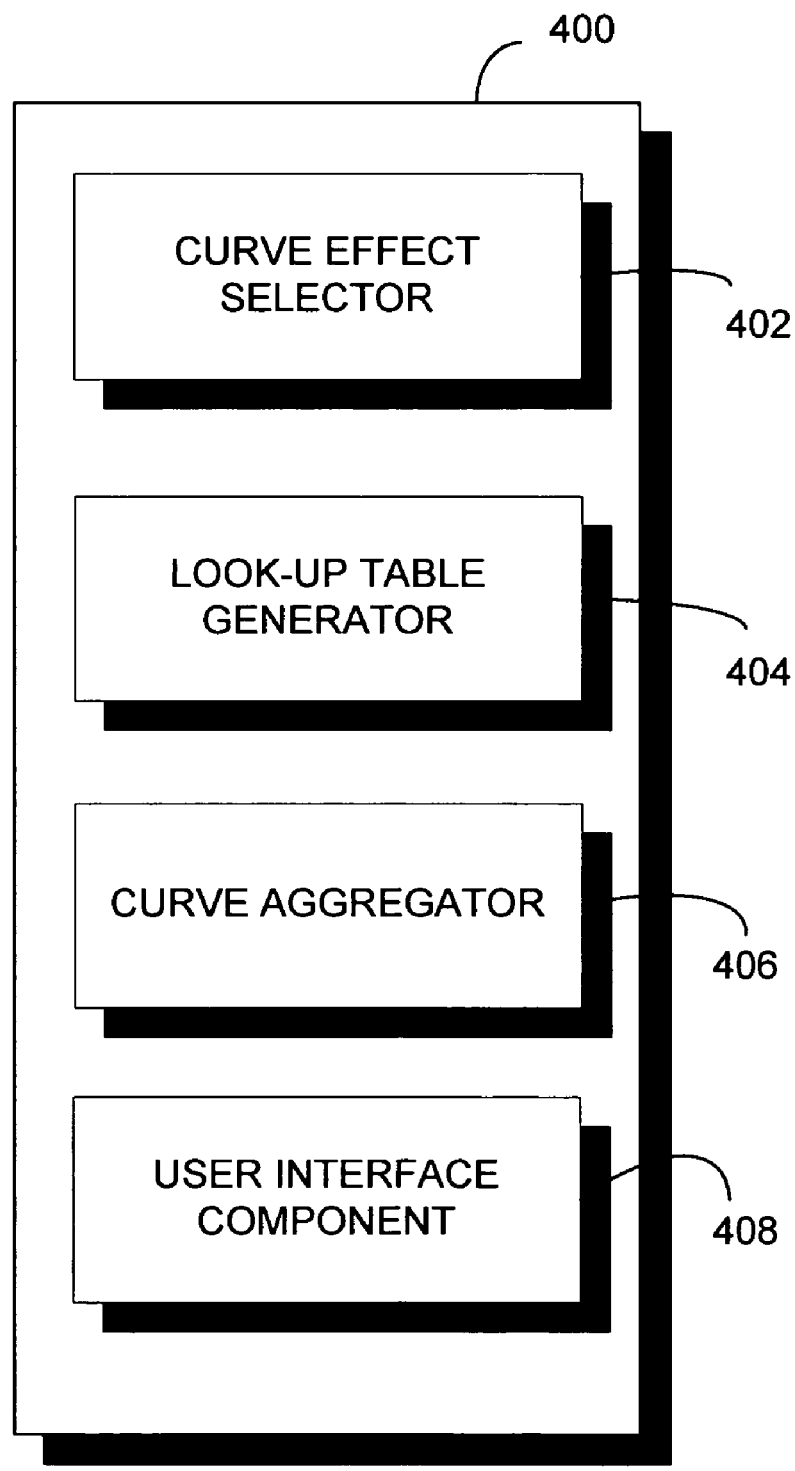
FIG. 4 is a schematic diagram illustrating a system for aggregating curve effects in an effects pipeline in accordance with one embodiment of the present invention.

As previously mentioned, the aggregation of multiple effects into a single transformation can improve the performance of a digital processing application. FIG. 4 illustrates a system 400 for aggregating the application of curve effects in an effects pipeline. The system 400 includes a curve effect selector 402. The curve effect selector 402 may be configured to identify a plurality of curve effects to be aggregated. The curve effects may be identified from a variety of sources. For example, the curve effect selector 402 may scan a graph for sequential effects. Further, an image processing application may automatically select effects based on various inputs and parameters.

Figure 5A:
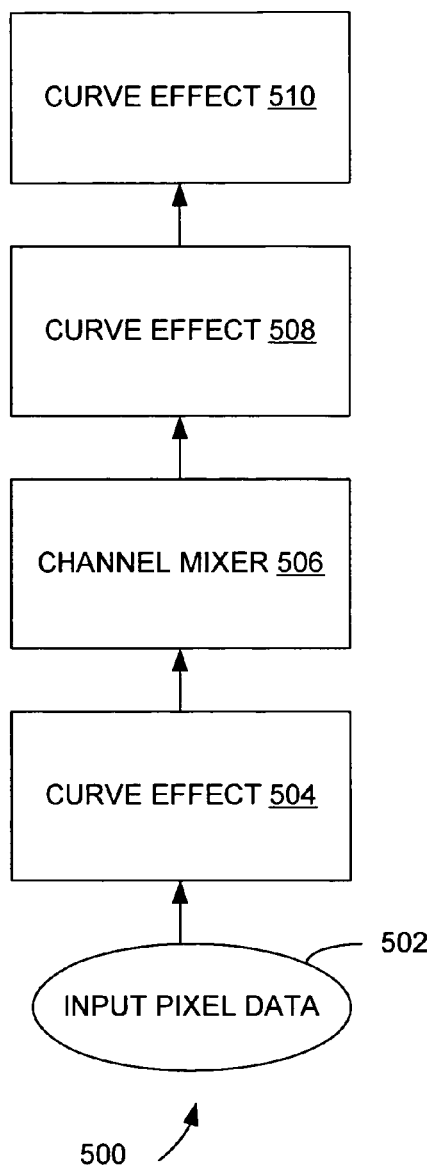
FIGS. 5A and 5B are a schematic diagram illustrating an exemplary effect pipeline in accordance with one embodiment of the present invention.
Figure 5B:
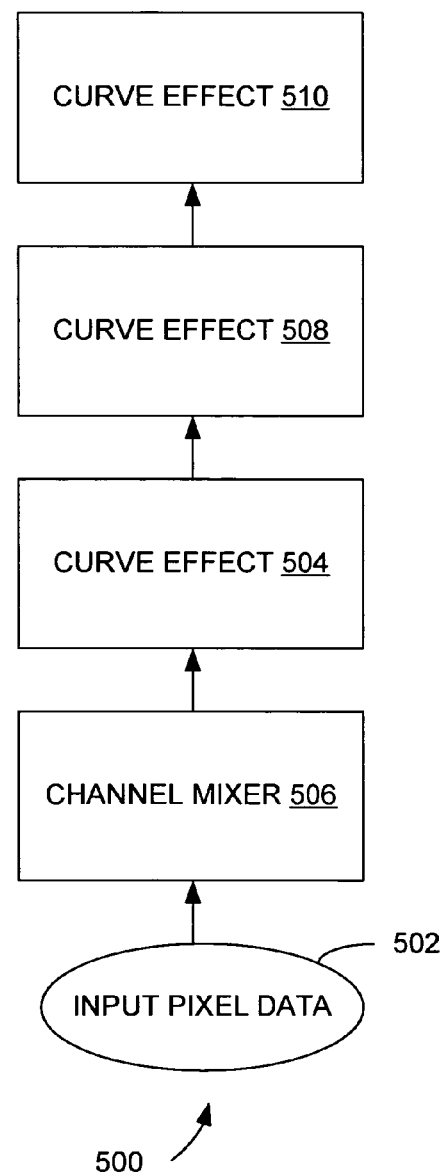

The curve effect selector 402 may also be configured to re-order operations in an effect pipeline so the identified effects are grouped into contiguous runs. Stated another way, the curve effect selector 402 may re-order the sequence of image processing steps so each of the identified effects occur one-after-the-other in the pipeline. FIGS. 5A and 5B provide an example of this reordering of an effect pipeline. FIG. 5A illustrates an exemplary effect pipeline 500. The effect pipeline 500 accepts input pixel data 502 from an image to be processed, and a first effect, a curve effect 504, is applied to the data 502. Subsequently, a Channel Mixer 506 applies a liner operation to the data 502. The image processing concludes after a curve effect 508 and a curve effect 510 are applied. Without re-ordering the effect pipeline 500, the curve effects 504, 508 and 510 cannot be aggregated because a linear operation, the Channel Mixer 506, is positioned between the curve effects 504 and 508. FIG. 5B illustrates the effect pipeline 500 that results from re-ordering the curve effects 504, 508 and 510. After the reordering, the linear operation, the Channel Mixer 506, is performed first, and then the curve effects 504, 508 and 510 are applied. As will be appreciated by those skilled in the art, so long as clipping and pixel bit-depth are not limiting factors, non-linear steps (e.g., exposure, color and contrast correction) may be easily applied as contiguous steps, while other non-aggregatable steps (e.g., saturation, channel mixing and sharpening) are moved to other parts of a pipeline. Unlike linear operations which are commutative, order is sometimes important with non-linear operations, and in some cases, re-ordering isn't an option.

Returning to FIG. 4, the system 400 also includes a look-up table generator 404. The look-up table generator 404 may be configured to generate an aggregated look-up table for use in the application of the aggregated effects. Similar to the curve look-up table 206 of FIG. 2, the aggregated look-up table provides output values associated with a set of input values. Generally, the aggregated look-up table provides the outputs that would result if input pixel data were fed through each curve effect separately. For example, instead of subjecting image data to the many look-ups of a system such as the system 300 of FIG. 3, an aggregated look-up table allows multiple curve effects to be applied with a single set of look-ups. A variety of techniques may be utilized to generate the aggregated look-up table, and an exemplary system for generating the aggregated look-up table is provided along with the discussion of FIG. 6A.

The system 400 also includes a curve aggregator 406. The curve aggregator 406 is configured to apply the multiple curve effects to a digital image by utilizing the aggregated look-up table. Pixel values from the digital image are fed into the aggregated look-up table, and output values are identified. These output values are combined to form an output image that reflects application of the curve effects. To display this output image, the system 400 includes a user interface component 408. Those skilled in the art will appreciate that the output image generated by the system 400, while only requiring one set of look-up operations, should be substantially identical to an output image generated by the system 300 of FIG. 3.

Figure 6A:
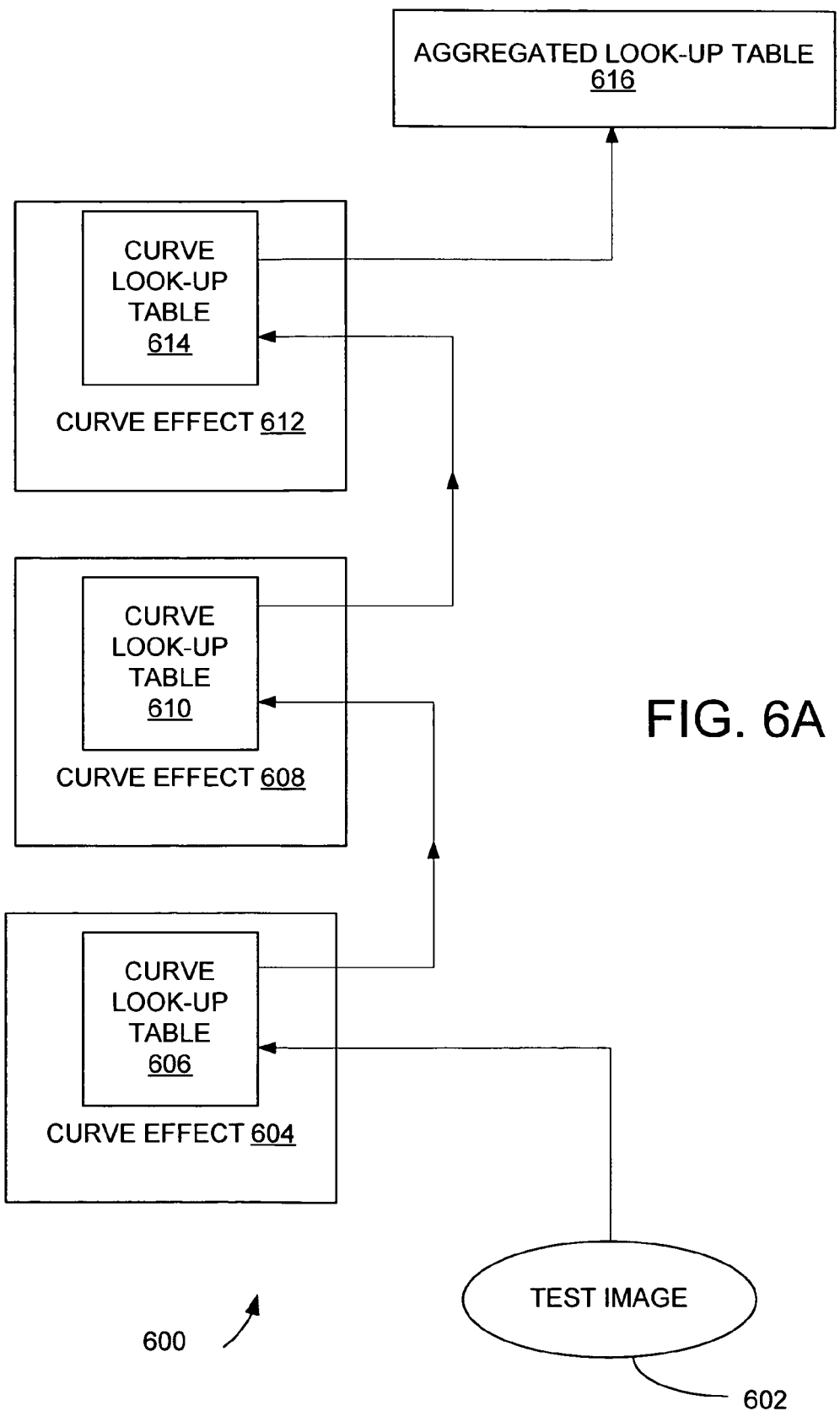
FIGS. 6A and 6B are a schematic diagram illustrating a system for applying multiple curve effects in accordance with one embodiment of the present invention.
Figure 6B:
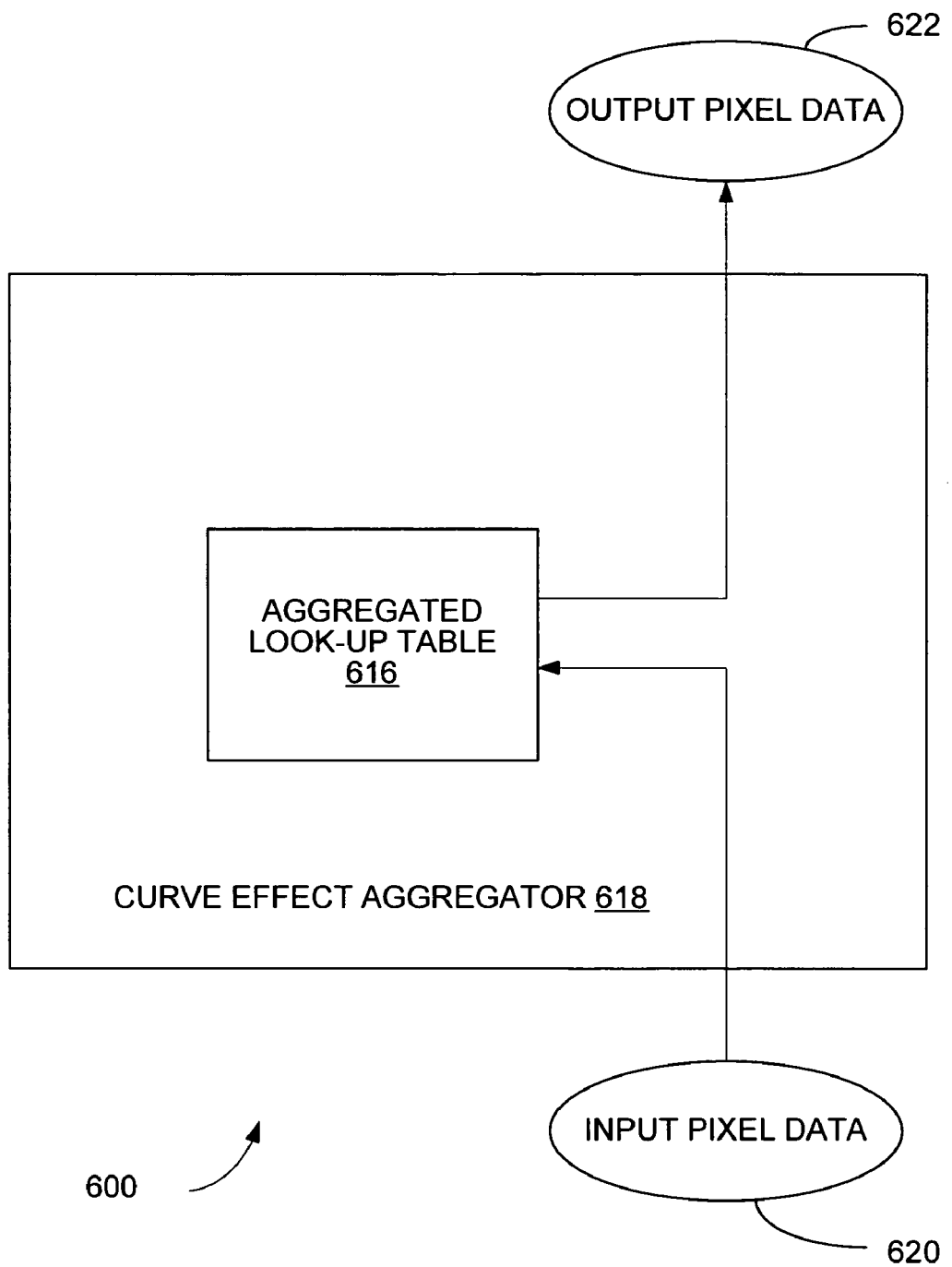

In accordance with one embodiment, FIGS. 6A and 6B provide an exemplary system 600 for generating an aggregated look-up table and using that table to apply curve effects to image data. It should be noted that the system 600 is provided merely as an example and that numerous systems and methods may be utilized to generate the aggregated look-up table.

The system 600 includes a test image 602. In one embodiment, the test image 602 is designed to provide every available or potential input value. An example of such an image is known in the art as a gradient image. The number of available inputs varies with the resolution of an image. For example, if 8 bits are used to describe a color, then there will be 256 ($2^8$) possible input values. In this case, the test image may be comprised of these 256 input values. As another example, for 16 bit resolution, there are 65,536 ($2^{16}$ or $256^2$) possible input values. So, a 256×256 image may be used to precisely capture each available input. A gradient image may also be used for float images. In cases such as this, some values may require interpolated readings from the curves. In a similar manner, not every possible input value need necessarily exist in the test image 602 if interpolation of the results using well-known interpolation techniques (e.g. bi-linear or bi-cubic) would result in accurate mappings with fewer test image sample points.

The test image 602 is fed into a curve effect 604, and a curve look-up table 606 is used to convert the test image 602 into an output image. This output image is then fed into a curve effect 608, so it may be altered as dictated by a curve look-up table 610. A third curve effect, a curve effect 612, is then applied by utilizing a curve look-up table 614. The outputs of the curve effect 612 are stored as an aggregated look-up table 616. By correlating the test image 602 with the aggregated look-up table 616, it can be determined how the curve effects 604, 608 and 612 altered each available pixel value. Thus, the aggregated look-up table 616 is a curve look-up table that associates input values with outputs.

Turning to FIG. 6B, the system 600 may use the aggregated look-up table 616 as an input to apply the curve effects 604, 608 and 612 to image data. A curve effect aggregator 618 is configured to receive input pixel data 620. As previously mentioned, the aggregated look-up table 616 has an output value for each possible input value. Accordingly, the input pixel data 620 may be converted by the curve effect aggregator 618 into output pixel data 622. The output pixel data 622 may be stored as an output image that reflects the application of curve effects 604, 608 and 612 to the input image. As will be appreciated by those skilled in the art, applying multiple curve effects with the curve effect aggregator 618 may reduce the time and resources necessary to apply the effects.

Figure 7:
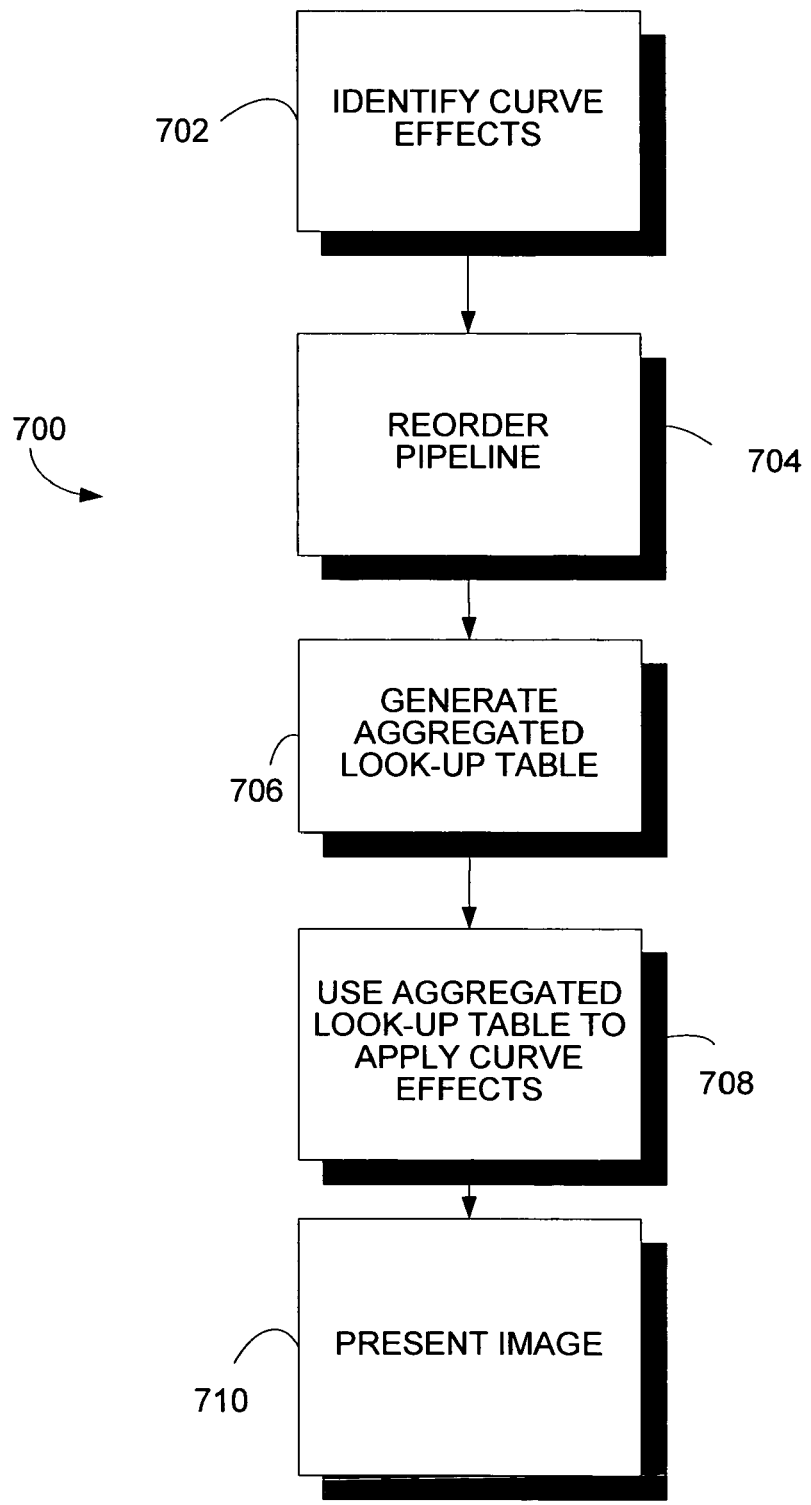
FIG. 7 illustrates a method in accordance with one embodiment of the present invention for applying curve effects.

FIG. 7 illustrates a method 700 for applying curve effects to a digital image. At 702, the method 700 identifies multiple curve effects in an effect pipeline. The method 700, at 704, reorders the effect pipeline to make the identified effects contiguous operations in the pipeline.

The method 700, at 706, generates an aggregated look-up table. In one embodiment, the method 700 applies the identified curve effects to a set of test pixels. The test pixels are fed through the effect pipeline, and the resulting output pixels are used to create the aggregated look-up table.

At 708, the method 700 uses the aggregated look-up table to apply the identified curve effects to a digital image. Instead of subjecting the input image to look-ups for each selected effect, the method 700 uses the aggregated look-up table to apply multiple effects as if only one effect were being applied. Pixel values from the input image are converted into output pixels. The method 700 presents these output pixels as an output image at 710.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. One or more computer-readable media having computer-useable instructions embodied thereon to perform a method for applying effects to a digital image, said method comprising:
    identifying a plurality of effects to be applied to said digital image, wherein said digital image includes a plurality of pixel values;
    generating an aggregated look-up table by applying said plurality of effects to a test image, wherein said generating includes sequentially applying said plurality of effects to said test image to generate a resultant image that is correlated with said test image to yield said aggregated look-up table, wherein said aggregated look-up table associates an output pixel value with each of at least a portion said plurality of test pixel values; and
    utilizing said aggregated look-up table to apply said plurality of effects to said digital image by identifying the output pixel value associated with each of at least a portion of said plurality of pixel values.

2. The media of claim 1, wherein said plurality of effects are selected to be applied with an effect pipeline.

3. The media of claim 2, wherein said method further comprises re-ordering said effect pipeline to make said plurality of effects contiguous operations in said effect pipeline.

4. The media of claim 1, wherein at least a portion of said plurality of effects are associated with one or more look-up tables.

5. The media of claim 4, wherein said generating said aggregated look-up table includes accessing at least a portion of said one or more look-up tables.

6. The media of claim 1, wherein said plurality of test pixel values includes each available pixel value.

7. The media of claim 1, wherein said aggregated look-up table is an image.

8. The media of claim 1, wherein said method further comprises presenting to a user an output image generated by the application of said plurality of effects to said digital image.

9. A system for aggregating the application of effects to a digital image having a plurality of pixel values, said system comprising:
    a effect selector configured to select a plurality of effects to be aggregated;
    a look-up table generator configured to generate an aggregated look-up table by applying said plurality of effects to a gradient image having a plurality of test pixel values, wherein said aggregated look-up table associates an output pixel value with each of at least a portion of said plurality of test pixel values, wherein said plurality of test pixel values includes each available pixel value; and
    an aggregator configured to apply said plurality of effects to said digital image by utilizing said aggregated look-up table to identify the output pixel value associated with each of at least a portion of said plurality of pixel values.

10. The system of claim 9, wherein said look-up table generator generates said aggregated look-up table by accessing at least one look-up table associated with at least one of said plurality of effects.

11. The system of claim 10, wherein said at least one look-up table is an image communicated to said look-up table generator from at least one computer program.

12. The system of claim 9, wherein said test image is a gradient image.

13. The system of claim 9, wherein said aggregator is further configured to store an output image that includes the identified output pixel values.

14. The system of claim 13, further comprising a user interface component configured to present said output image to a user.

15. One or more computer-readable media having computer-useable instructions embodied thereon to perform a method for applying effects to a digital image, said method comprising:
    identifying a plurality of effects;
    re-ordering an effect pipeline to make said plurality of effects contiguous operations in said effect pipeline;

generating an aggregated look-up table by utilizing a plurality of look-up tables to convert test pixel values into output pixel values, wherein said generating includes sequentially applying said plurality of effects to a test image to generate a resultant image that is correlated with said test image to yield said aggregated look-up table, wherein said aggregated look-up table associates each of at least a portion of said test pixel values with one of said output pixel values; and utilizing said aggregated look-up table to apply said plurality of effects to said digital image;

wherein said generating an aggregated look-up table is performed by a graphics processing unit.

16. The media of claim 15, wherein said method further comprises presenting an output image to a user.

17. The media of claim 15, wherein said test pixel values include each available pixel value.

18. The media of claim 15, wherein said aggregated look-up table is an image.

19. The media of claim 15, wherein said converting said digital image into said output image is performed by a graphics processing unit.

20. The media of claim 15, wherein said utilizing includes converting said digital image into an output image by utilizing said aggregated look-up table.

* * * * *